(12) United States Patent
Geriniere et al.

(10) Patent No.: US 8,393,378 B2
(45) Date of Patent: Mar. 12, 2013

(54) GROUP CONTROL METHOD FOR CONTROLLING MOTOR-DRIVEN SCREENS AS A GROUP, AUTOMATIC MOTOR CONTROL FOR IMPLEMENTING THE METHOD, AND HOME AUTOMATION INSTALLATIONS INCLUDING SUCH AUTOMATIC MOTOR CONTROL

(75) Inventors: Pierre Geriniere, Cluses (FR); Stephane Lapierre, Sallanches (FR)

(73) Assignee: Somfy SAS, Cluses (FR)

( * ) Notice: Subject to any disclaimer, the term of this patent is extended or adjusted under 35 U.S.C. 154(b) by 141 days.

(21) Appl. No.: 12/991,113

(22) PCT Filed: May 14, 2009

(86) PCT No.: PCT/FR2009/050894
§ 371 (c)(1),
(2), (4) Date: Nov. 4, 2010

(87) PCT Pub. No.: WO2009/150345
PCT Pub. Date: Dec. 17, 2009

(65) Prior Publication Data
US 2011/0061818 A1    Mar. 17, 2011

(30) Foreign Application Priority Data
May 15, 2008   (FR) ...................... 08 53146

(51) Int. Cl.
*E06B 9/32* (2006.01)

(52) U.S. Cl. ................. 160/113; 160/120; 160/168.1 P; 318/264

(58) Field of Classification Search ................. 160/113, 160/120, 168.1 P, 188
See application file for complete search history.

(56) References Cited

U.S. PATENT DOCUMENTS

| | | | |
|---|---|---|---|
| 6,069,465 A * | 5/2000 | de Boois et al. | 318/675 |
| 7,202,615 B2 * | 4/2007 | Morris et al. | 318/38 |
| 8,065,039 B2 * | 11/2011 | Mullet et al. | 700/279 |
| 8,125,165 B2 * | 2/2012 | Cieslik | 318/101 |
| 2005/0173080 A1 | 8/2005 | Cameron et al. | |
| 2006/0267529 A1 * | 11/2006 | Piefer et al. | 318/432 |
| 2008/0313299 A1 * | 12/2008 | Ebbe et al. | 709/208 |
| 2010/0006240 A1 * | 1/2010 | Cieslik | 160/405 |
| 2011/0061818 A1 * | 3/2011 | Geriniere et al. | 160/168.1 P |

FOREIGN PATENT DOCUMENTS

| | | |
|---|---|---|
| EP | 0095108 A | 11/1983 |
| EP | 0913748 A | 5/1999 |
| JP | 08210054 A | 8/1996 |

* cited by examiner

Primary Examiner — Blair M. Johnson
(74) Attorney, Agent, or Firm — Dowell & Dowell, PC

(57) ABSTRACT

According to the method of the invention, the movement of movable screen ends for a group of motor-driven screens to a common position is controlled in a grouped manner. The method includes a step (E150) consisting of moving the end of a screen when said end becomes the farthest from the common position after moving the end of at least one other screen to said common position.

10 Claims, 4 Drawing Sheets

GROUP CONTROL METHOD FOR CONTROLLING MOTOR-DRIVEN SCREENS AS A GROUP, AUTOMATIC MOTOR CONTROL FOR IMPLEMENTING THE METHOD, AND HOME AUTOMATION INSTALLATIONS INCLUDING SUCH AUTOMATIC MOTOR CONTROL

BACKGROUND OF THE INVENTION

1. Field Of The Invention

The present invention relates to a group control method for controlling as a group a plurality of motor-driven screens equipped with respective bottom weighting bars or "load bars". Such screens may be venetian blinds or shades or other analogous blinds or shades. This type of screen is provided with a least one raising cord, connected to the load bar, and winding around a shaft driven in rotation by an actuator. The screens may also be roll-up fabric blinds or shades, or indeed roller blinds or roller shutters. In any event it is necessary for the position of the load bar of a screen to be measured as independently as possible from the position of the screen.

2. Brief Description Of The Related Art

In order to drive a plurality of motor-driven screens, it is known that automatic motor control can be used that makes it possible to manage the screen positions and/or the slat angular positions of the screens of the group in such a manner that each screen has the same screen position and/or the same slat angular position after a group command. The driving is generally achieved by operation of the "master-and-slave" type in which a "master" screen drives the "slaves", i.e. the other screens of the group. The slave screens reproduce the configuration, i.e. the screen position and/or the slat angular position of the master screen, as described in Application JP-A-08210054. As specified in EP-A-0 913 748, the screen position and/or the slat angular position of a screen can be adjusted by calculating motor or time pulses by means of a microprocessor. Correspondence between those pulses and screen position or slat angular position may be defined directly.

The stroke of a screen is determined by the distance travelled by the load bar between first and second predetermined positions. The first position or "upper limit" generally corresponds to a load bar position in which the screen is fully open. The load bar then reaches a top abutment. The top abutment is a stop position desired by the user. The second position or "down limit" corresponds to a load bar position such that the screen is fully closed. The load bar then reaches a bottom abutment. In the preceding patent applications, all of the screens have substantially the same stroke and the same upper limit positions.

The position of the load bar of a screen is measured relative to a predetermined reference position. In addition, a calibration operation may be provided that makes it possible to define the same reference position for all of the screens of the group after installation. Such a reference position is described as a common specific position corresponding to all of the tops-of-stroke of the screens in the group.

Thus, when a load bar movement instruction is executed for moving the load bars to a precise desired position of the screen stroke, each load bar of the screens of the group moves towards that position defined relative to the common reference position. At the end of the operation, all of the load bars lie at the same position and are aligned. However, if the load bars of the screens of the group are not aligned at the time the instruction is issued, then each load bar moves independently from the other load bars. That results in the movements of the screens of the group not being harmonious due to the variations in amplitudes of movement of the load bars. In addition to the unpleasing appearance, such unevenness does not make it possible to have rapidly information about the synchronization of the screens, and in particular of their counter means, or about the screening states of the other screens in the group.

The same applies when a group command for opening or for closure is executed for a group of screens in which the load bars are not aligned. Alignment of the load bars can be obtained in the end limit position, after movements of various amplitudes.

Alignment of the load bars of roller blinds during an operation is known from US-A-2005/0173080 that describes speed compensator means for two screens of different configurations, which means act so that the load bars of both screens move level with each other when they are caused to move simultaneously. However, when those load bars are not initially level with each other, that system does not make it possible to align the load bars while they are moving.

SUMMARY OF THE INVENTION

The invention proposes a group control method for controlling a plurality of screens as a group that mitigates the preceding drawbacks.

To this end, the invention provides a group control method for causing the moving ends of the screens of a group of motor-driven screens to move towards a common position, said group control method being characterized in that it includes a step consisting in moving the end of a screen as soon as said end becomes the end that is furthest from the common position, as a result of the end of at least one other screen being moved towards the common position.

The term "common position" is used to mean a final position to be reached or an intermediate position relating to a movement instruction, in which final or intermediate position the ends of the screens that are caused to move can be aligned.

Each of the screens forming the group controlled by the method of the invention has a moving end that moves over its own predefined stroke. The group control instructions may be instructions for opening, closing, stopping, or moving towards a predefined intermediate position. The invention is particularly suitable when the moving end is a load bar of a screen. However, the moving end may also be a side edge of a tilting slat. In which case, the stroke of the screen also includes the path of said moving end when a slat pivots about its pivot axis. "Opening" the screen then corresponds to slat angular positioning that allows light to pass through. The plane of the slats is substantially perpendicular to the plane forming the opening equipped with the screen. "Closing" or "closure" corresponds to slat angular positioning that blocks out the light. The plane of the slats is then substantially parallel to the plane forming the opening.

Advantageously, once the moving end of a screen comes into alignment with the moving end of one or more other screens in the group, all of these screens are then moved simultaneously.

For an open group control instruction, a first step of the method consists in causing the screen(s) that is/are furthest closed to open. Then, as soon as a moving end of one of these synchronized screens reaches the position of the moving end of another screen in the group, an open instruction is executed for said other screen. This step is repeated for each screen of the group until all of the screens are moving, until a stop instruction is issued, or until all of the screens are open.

For a close group control instruction, the method is analogous. It includes a first step consisting in closing the screen(s)

that is/are furthest open. Then, as soon as the moving end of a screen that is moving reaches the position of the moving end of another screen, a close instruction is executed for said other screen. The step is repeated for each screen until all of the screens are moving, until a stop instruction is issued, or until all of the screens are closed.

For an instruction to go into an intermediate position, the same logic applies. All of the screens that have their moving ends below the position to be reached are caused to move in the same way as for the above-described open group instruction. Conversely, all of the screens that have their moving ends above the position to be reached are caused to move in the same way as for the above-described close group instruction. As soon as a screen reaches the intermediate position, a stop instruction is transmitted to it.

When caused to move in this way, the moving ends of the screens in the group move level with one another during the final stage of the opening or closure movement. Therefore, if a screen is not correctly synchronized with the other screens, it is rapidly identified, and a resynchronization operation can be triggered for that screen. Synchronization of a screen results essentially from the synchronization of the counter means specific to each screen.

Another advantage of this type of control is that the screening state of the screens of the group is better mastered. With prior devices, after a normal close group command, a stop instruction does not give any indication as to the different positions of the screens of the group. For example, if a group of screens is caused to be closed based on a screen that is partially closed, while the other screens are open, group stopping of the screens gives rise to various levels of closure. When the screen on which closure is based is closed, the other screens are still partially open. Thus a stop group instruction in such a configuration gives rise to screening-level disparity, which might not be desirable for reasons of security or of protection against the sun. With the method of the invention, intermediate stopping gives an indication about the states of deployment of all of the screens in the group. For example, on execution of a close instruction, the screens are deployed to at least the same extent as the reference screen.

For an instruction to go into an intermediate position, the dynamic alignment depends on the positions of the various moving ends of the screens. If all of the moving ends are above the intermediate position or if all of tload are below said intermediate position, then all of the moving ends move level with one another over the final stage of the movement. Otherwise, there are two dynamic alignments. The moving ends that lie above the intermediate positioned move in mutually aligned manner over the final stage of the movement, while the moving ends that lie below the intermediate position form a second group in which they move in mutually aligned manner over the final stage of the movement.

In another advantageous aspect of the invention, the method includes steps prior to the above-mentioned steps, and consisting in:

i) identifying the state of opening of the screens of the group of screens;

ii) selecting at least one master screen; and iii) moving the load bar of the master screen as a function of the received instruction.

Advantageously, the moving end of a screen is its load bar.

The invention also provides automatic motor control for controlling a group of screens incorporating means for implementing a group control method as mentioned above.

Finally, the invention provides home automation installations. In a first variant, the motor-driven screens are fabric blinds or shades, or venetian blinds. In another variant, the motor-driven screens are sunshades or louvers.

BRIEF DESCRIPTION OF THE DRAWINGS

The invention can be better understood on reading the following description given by way of example, and with reference to the accompanying drawings, in which.

DESCRIPTION OF THE PREFERRED EMBODIMENTS

Figure 1:
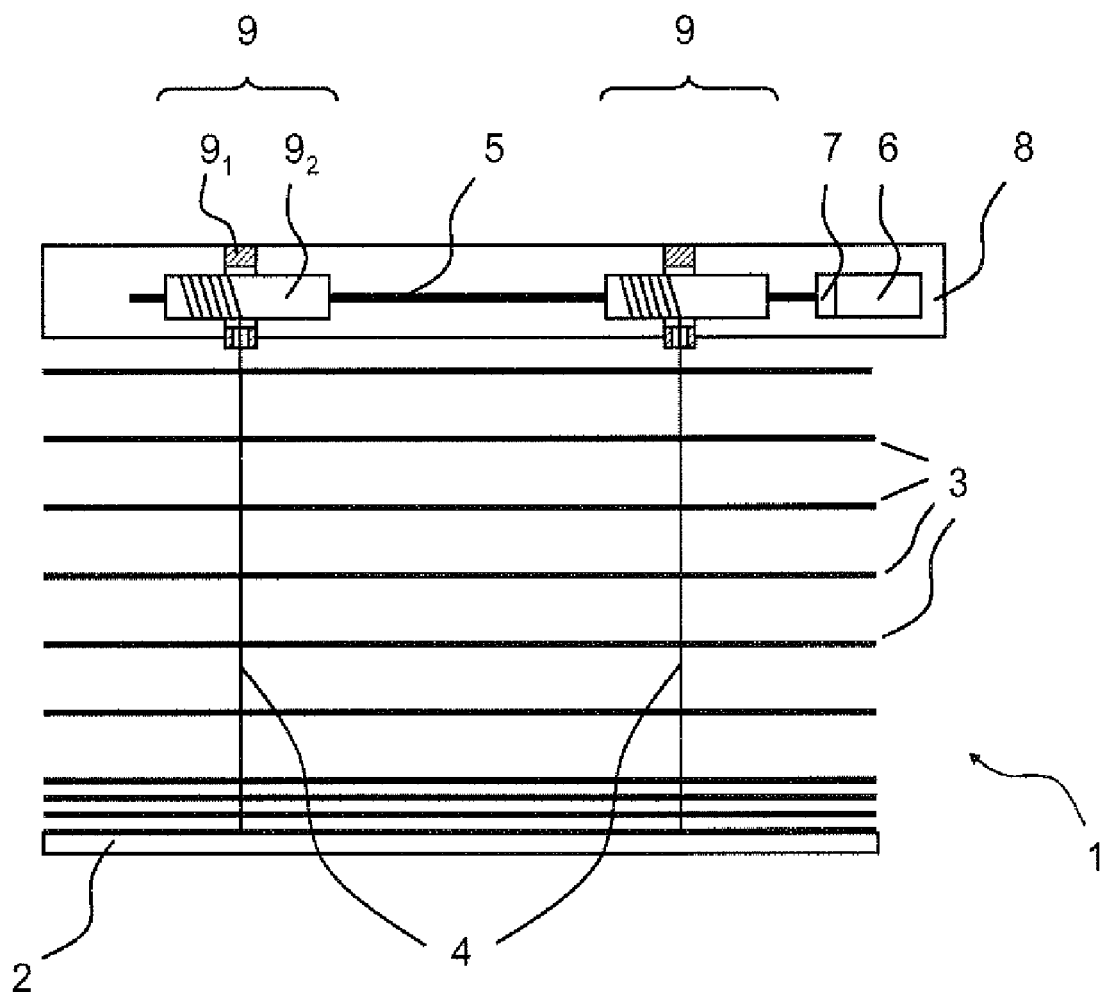
FIG. 1 is a view of a screen suitable for being configured by the method of the invention.

The control method of the invention is designed to control a plurality of screens equipped with respective load bars. This type of screen may be a motor-driven venetian blind in an installation 1 as shown in FIG. 1. The screen includes a moving portion including a load bar 2 and angularly positionable slats 3, the moving portion being designed to screen an opening. The load bar 2 is connected to roll-up devices 9 via two cords 4. Each roll-up device 9 comprises a drum $9_2$ around which the corresponding cord 4 is wound, and guide means $9_1$ making it possible to guide the cord towards the drum. The two drums $9_2$ are interconnected by a shaft 5 driven in rotation by an actuator 6. This actuator is provided with counter means 7 making it possible to compute the position of the load bar relative to a predetermined reference position that is specific or intrinsic to the screen. These counter means may be constituted by an encoder measuring the number of revolutions effected by the shaft 5 relative to the predetermined reference position.

Means (not shown) for angularly positioning the slats may also be provided. They may be independent of the roll-up device or else be associated therewith. Generally, the roll-up devices 9 and the actuator 6 are disposed entirely inside a box 8. The counter means 7 may also be used to determine the angular position of the tilting slats.

Other types of screen may be used with the method of the invention, such as roll-up sheet-fabric shades or roll-up slats. Preferably, each screen has an actuator and a roll-up system making it possible to move its load bar at a speed substantially equivalent to the speed of the other load bars of the screens in the same group of screens. In addition, the method requires it to be possible to identify the position of a load bar of a screen relative to the position of a load bar of another screen in the group. For this purpose, it is preferable for each counter means 7 specific to a screen to incorporate a reference position that is common to the group. The state of opening of one screen relative to another can thus be defined relative to said common reference position.

The control method of the invention is adapted for an installation as shown in FIGS. 2 to 5. These figures show an installation made up of three screens 10, 20, and 30.

Each of the screens 10, 20, and 30 has a respective load bar 11, 21, and 31, and a respective fabric sheet or a respective set of slats 12, 22, and 32. Each load bar moves over a stroke defined by an upper limit and by a down limit. Below, it is considered that a screen is caused to "open" when its load bar is moved upwards, towards its upper limit. Conversely, a screen is caused to "close" when its load bar is lowered towards its down limit. Similarly, the expressions "in an opening direction" and "in a closure direction" correspond to movements of a load bar of a screen respectively towards and away from its upper limit.

The upper limits and the down limits, set by the user, are defined relative to a reference position specific to each screen. A reference position R, common to the screens 10, 20, and 30, is taken into account in order to assess the opening of one screen relative to the others. Preferably, said common reference position R corresponds to the upper limit of the highest screen. Similarly, it is preferable for this common reference position R to correspond to the counting reference for all of the screens of the group.

Driving the screens of the group must be centralized in order to obtain the desired effect. The screens managed by the method of the invention are thus controlled by an "intelligent" system that is connected to each screen, directly or otherwise. FIGS. 2 to 5 diagrammatically show a control unit 100 connected to each actuator (not shown) driving a screen of the group. The connection may be by wire, by radio, or implemented by other communication means. Similarly, the control unit of the group may be at the level of one of the actuators of the group, it being possible for each actuator to dialogue with the other actuators of the group via a suitable connection. The control unit 100 also makes it possible for the positions of the screens of the group to be managed in centralized manner.

The unit 100 and its peripherals, in particular the counter means 7, provide automatic motor control making it possible to implement the methods described below.

Figure 2:
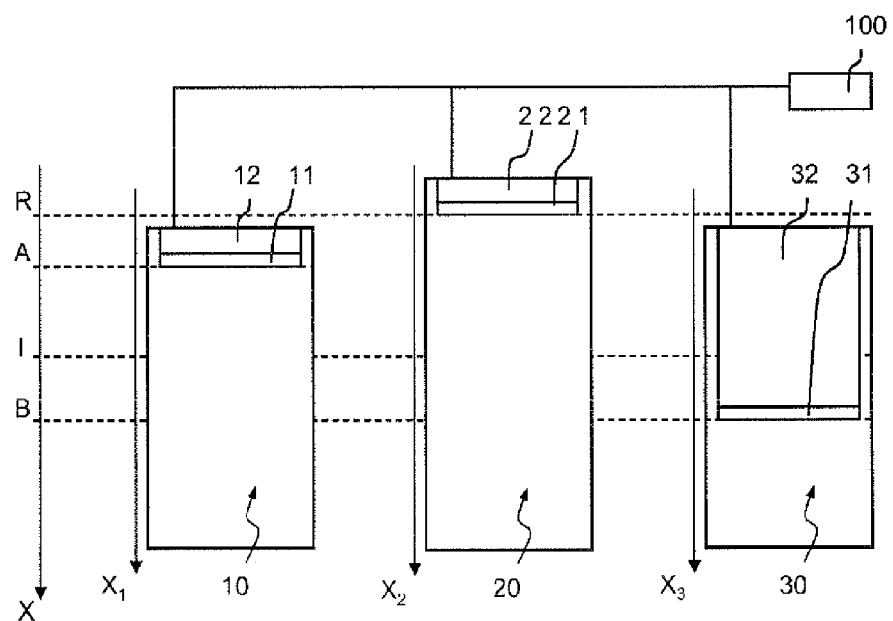
FIGS. 2 to 5 are views of the various deployment configurations of screens of an installation that has its screens controlled by a method of the invention.
Figure 3:
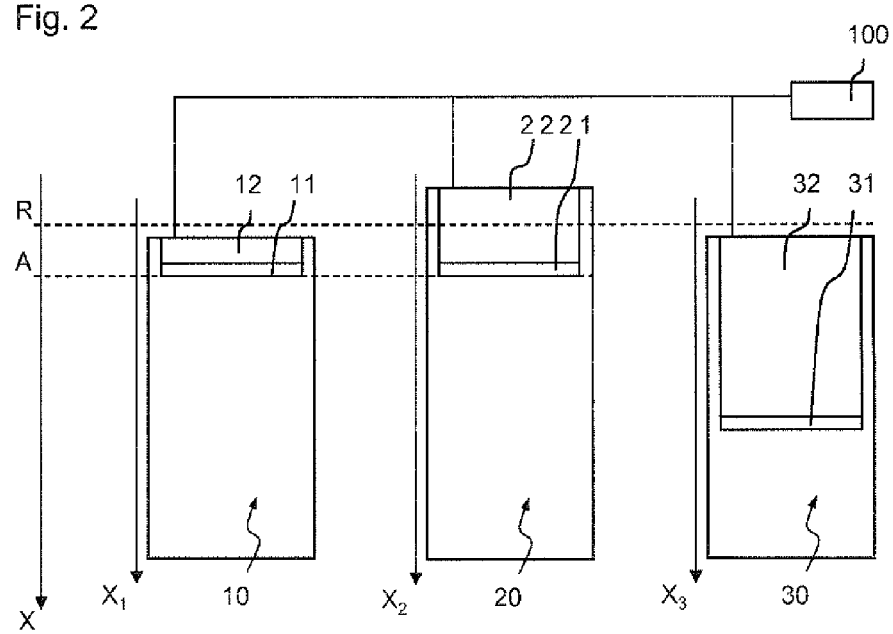
Figure 4:
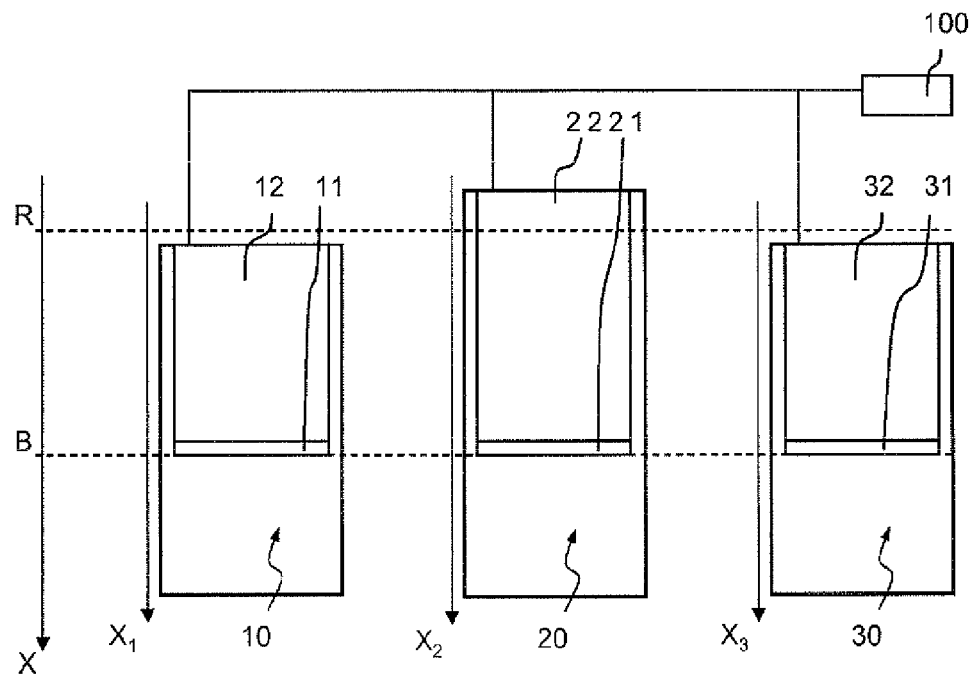

FIG. 2 shows a first configuration of the installation, in which configuration the deployment is different for all three screens. When a close group instruction is issued, the screen that is furthest open is identified, i.e. the screen 20, in this example, and only its load bar 21 is moved in a closure direction in which the screen 20 is closed, i.e. in a direction in which the bar 21 is lowered. As soon as it reaches the position A corresponding to the position of the load bar 11 of another screen 10, as shown in FIG. 3, then the load bar 11 is instructed to move in a closure direction in which the screen 10 is closed. Both of the load bars 11 and 21 then move simultaneously and level with each other. Once they reach the position B, corresponding to the load bar 31 of the screen 30, as shown in FIG. 4, then the third load bar 31 is caused to move in the closure direction in which the screen 30 is closed. All three load bars 11, 21, and 31 then continue to move until they reach their respective down limits, or until a stop group instruction is executed.

For an open group instruction, the principle is the same, the screen that is furthest closed being caused to start opening first.

When two or more screens are substantially at the same level, their load bars are instructed to move simultaneously. For example, if the close group instruction is issued when the installation is in the configuration shown in FIG. 3, the load bars 11 and 21 are instructed to move simultaneously.

Figure 5:
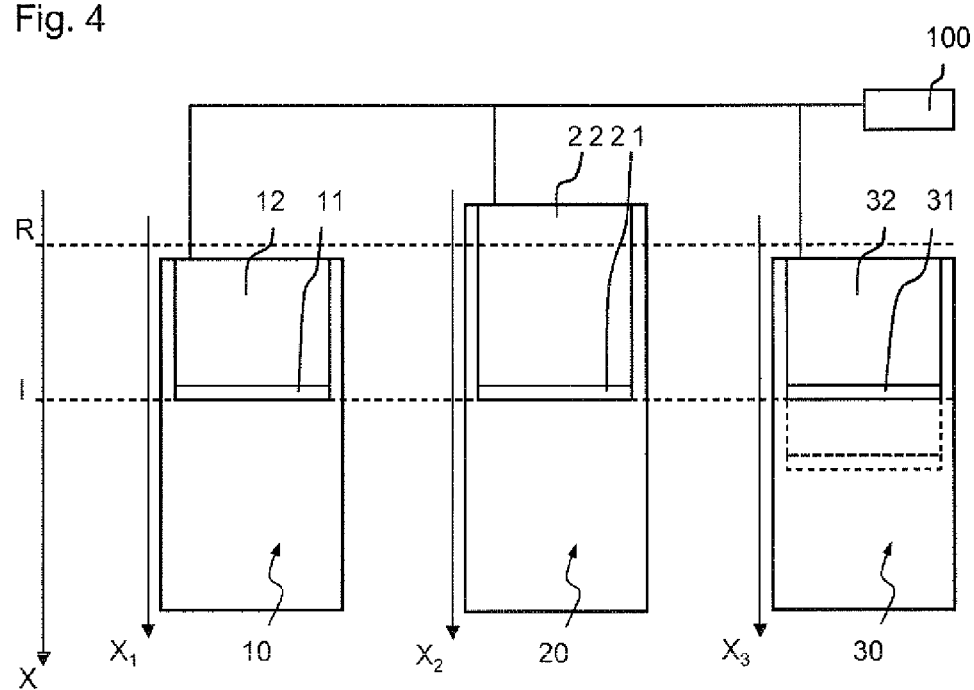

When a control member issues a movement instruction for movement to an intermediate position I, as shown in FIG. 5, starting from an initial configuration such as the configuration shown in FIG. 1, various scenarios are possible.

In a first scenario, only the screens that have their load bars situated above the intermediate position are caused to move in a closure direction. The instruction is treated as a close group instruction for the screens 10 and 20, with the feature that the two screens stop when the intermediate position I is reached. The third screen 30 is then caused to move towards the intermediate position, in an opening direction, so as to go from the configuration in dashed lines to the configuration in solid lines in FIG. 5. At the end of the operation, the load bars of all three screens are aligned at the level of the intermediate position.

The second scenario is comparable to the first scenario. Only the screens that have their load bars lying below the intermediate position I are caused to move in a first stage, in a closure direction. In this example, only the screen 30 is caused to move, the other two screens not moving. Then the screens that have their load bars lying above the intermediate position I are moved towards the intermediate position.

In the third scenario, when there are load bars both above and below the intermediate position, and on receiving the instruction, the load bar of the furthest-open screen and the load bar of the furthest-closed screen are moved simultaneously towards the intermediate position. The load bars of the other screens are then moved as soon as one of those two load bars has reached their level. At the end of the operation, all of the load bars are aligned on the intermediate position.

For user comfort, it is possible to disable movement of certain screens of the group. Thus, after an operation on the home-automation system such as, for example, activation of a button at a local control point, it is possible to prevent any movement of the associated screen that is commanded by a group control instruction. The restriction of movement can thus depend on the group control instruction and/or on the configuration of the screens. For example, an instruction to go to an intermediate position may cause only those screens that lie above the intermediate position to move, the screens lying below the intermediate position not being moved.

Figure 6:
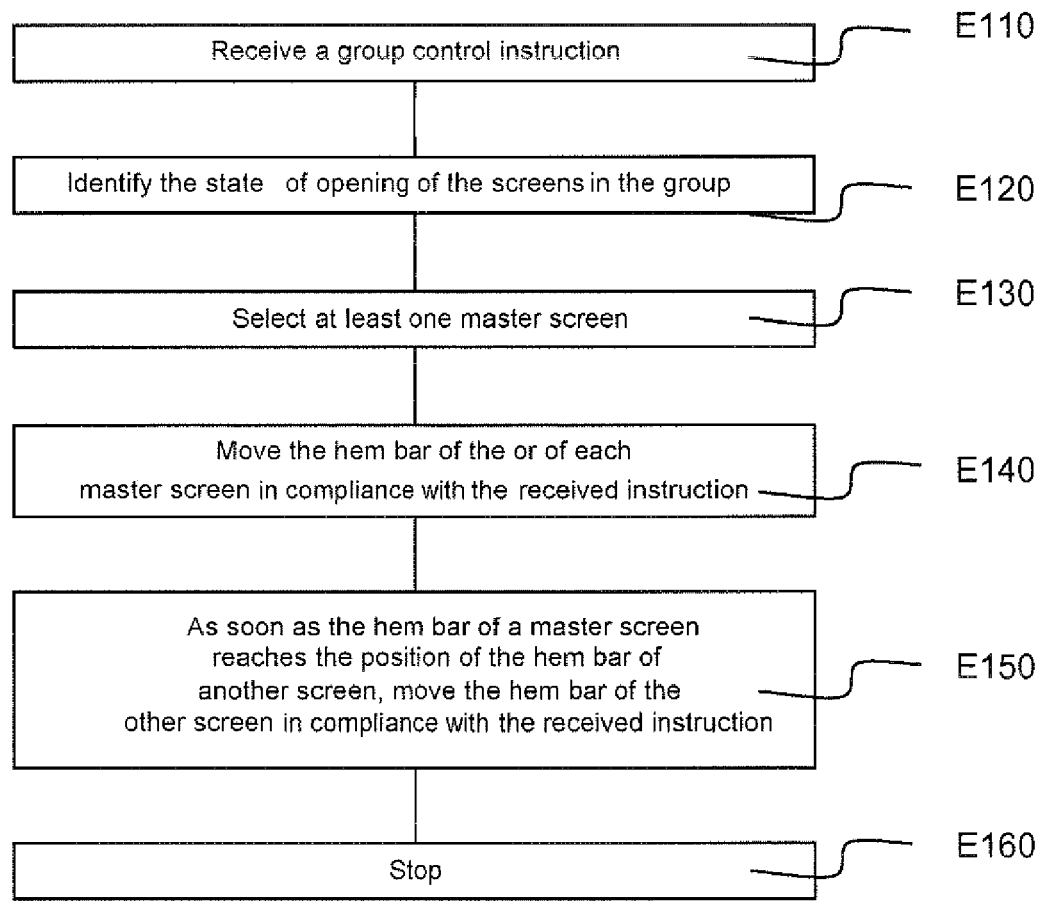
FIG. 6 is a flow chart of the group control method of the invention for controlling as a group.

The proposed method makes it possible to procure dynamic alignment of the load bars of the screens in a group following a group control instruction. Such a method of group control that procures this function is shown in FIG. 6 and it preferably comprises the following steps:

In a first step E110, the group control instruction is received by a receiver that is suitable for managing movement of the screens in the group.

In a second step E120, and as a function of the positions gathered via the counter means, the receiver identifies the state of opening of each screen in the group of screens. These different positions can be recorded at the receiver. It is then possible to deduce which screen is the screen that is furthest open, or which screen is the furthest closed, relative to a common reference point R.

Then, as a function of the issued instruction, a "master" or "reference" screen is selected in a third step E130. Said master screen corresponds to the screen that is to be moved first. For a close group instruction, it is the screen that is the furthest open, as mentioned with reference to screen 20 in the example in FIGS. 2 to 4. For an open group instruction, it is the screen that is furthest closed. For an instruction to move towards an intermediate position, it depends on the configuration of the installation at the time of the command, and on the intermediate position to be reached, as explained with reference to FIG. 5. The master screen can then be the screen that is furthest open, the screen that is furthest closed, or there can be two master screens, namely the screen that is furthest open and the screen that is furthest closed, and the two screens are then caused to move simultaneously, or in staggered manner.

When one or more screens are situated at the same level as a master screen, such screens are also considered to be master screens. In which case, a single reference screen may be designated in order to serve as a reference for driving the group. Generally, the master screen is the screen having its load bar furthest away from the common position that is desired for the various load bars of the screens in the group, at the ends of their respective movements.

In a fourth step E140, only the load bar of the master screen or of each of the master screens is instructed to move. The movement depends on the issued instruction: opening or closure of the screen(s). It should be noted that a plurality of load bars can be moved in this step. Certain movements can also be in opposite directions, when the master screens converge towards an intermediate position.

In a fifth step E150, the load bars of the other screens in the group are instructed to move as soon as the load bar of a master or reference screen has reached its position. This step can be performed by monitoring only the successive positions of the load bar(s) of the master screen(s). Thus, as soon as the load bar of a master screen has reached the position of a load bar of another screen, which position is recorded in step E120, said other screen is instructed to move.

In other words, during the step E150, each screen is activated in compliance with the group control instruction received in step E110, as soon as its load bar becomes the furthest away from the common position that is desired for the load bars, because the load bar of the master screen has reached its level. As soon as the load bar of the master screen, and possibly the load bars of the other moving screens, reach(es) the level of the load bar of a screen that is standing still, the load bars of the screen at a standstill and of the master screen are simultaneously the furthest away from the desired common position, regardless of whether said position is a fully closed or fully open position, or an intermediate position I, such as the position shown in FIG. 5.

The movement of the load bars is stopped in a sixth step E160, when a stop group instruction is issued, or when an end limit or the desired intermediate position is reached.

The method is also usable for screens that move in horizontal translation, or for tilting screens, such as sunshades or louvers that are angularly positionable, and of horizontal or vertical axis. In which case, the desired effect is visual comfort, obtained by the uniform nature of the protection against the sun acting on the space inside the building.

For screens that move in horizontal translation, movement in the closure direction or "closure movement" corresponds to deploying a screen in such a manner as to cover an opening associated with the screen. With reference to FIG. 2 of the drawings, if one rotates Sheet 2 of the drawings 90° counterclockwise, screen 22 can be envisioned in a fully open position relative to an opening. To move the screens horizontally to the right to fully close the opening, screen 22, the farthest from the desired closed position is initially moved until load bar 21 aligns with load bar 11 at which time both screens 22 and 11 are moved toward the closure position. When load bars 11 and 21 align with load bar 31 of screen 32, all three screens will simultaneously move to a fully closed position. Conversely, movement in the opening direction or "opening movement" corresponds to retracting the screens from their positions as shown in FIG. 2 to the left, when the figure is view after being rotated 90° counterclockwise. During such opening movement screen 32 is moved to the left until load bar 31 aligns with the load bar 11 of screen 12 after which both screens 12 and 32 are simultaneously moved to the fully open position of screen 22.

For tilting screens, movement in a closure direction corresponds to angularly positioning the slats in such a manner as to reduce the amount of light passing through the slats. In addition, movement in an opening direction corresponds to angularly positioning the slats in such a manner as to allow more light to pass through the slats.

In addition, the installation may include a system making it possible to compensate for variations in speed between the various screens. With such a system, it is possible to obtain dynamic alignment of the moving ends even when the screens of the group do not have the same speed of operation, as can apply if the roll-up diameters of the screens differ. By regulating the speed specific to a screen, it is also possible to maintain the alignment of the load bars during the instructed operation.

Provision may also be made in the method of the invention so that, when a group instruction is issued, the load bars are aligned on a predefined position before the load bars are moved towards the desired final position. Such an implementation is more particularly pertinent when the screens are not initially at the same level, as in FIG. 2 or 3. This mode of driving can be illustrated as follows: starting from the screens being in a configuration as shown in FIG. 2, a close group instruction is issued. The load bars are then instructed to move towards the intermediate position I in FIG. 5. The bars 11 and 21 then move downwards while the load bar 31 moves upwards to the position I. Then all of the load bars move down together, in alignment, until all of the screens are closed. This mode of driving is also applicable for an open group instruction or for an instruction to move to an intermediate position. The predefined position is preferably a position dependent on the position of the screens of the group. Advantageously, this position is the mean position between the position of the screen that is furthest open and the position of the screen that is the furthest closed.

The invention claimed is:

1. A group control method for causing movable ends of a group including a plurality of separate motor-driven screens to move from respective non-aligned positions towards a common aligned position in both opening and closing directions, the method comprising the steps of:
   A. Continuously sensing a current position of the movable end of each screen relative to a predetermined reference position and providing the current position to a controller;
   B. Selecting a common position to which the movable ends of each of the screens is to be moved and providing the common position to the controller; and thereafter
   C. moving the movable end of at least one screen that is furthest from the common position toward the common position without moving the movable ends of screens that are closer to the common position until the movable end of the at least one screen aligns with the movable end of at least one other screen.

2. A group control method according to claim 1, wherein once the movable end of the at least one screen comes into alignment with the movable end of at least one other screen in the group, simultaneously moving the at least one screen and the at least one other screen toward the common position at a common speed.

3. A group control method according to claim 1, wherein in step C causing the movable end of the at least one screen that is furthest closed relative to the common position to be moved in an opening direction.

4. A group control method according to claim 1, wherein in step C causing the movable end of the screen that is furthest open relative to the common position to move in a closure direction.

5. A group control method according to claim 1, wherein a sequence of movement of the movable ends of the screens depends on initial positions of the movable ends relative to the common position.

6. A group control method according to claim 1, including the additional steps of:
   I) identifying a state of opening of the screens of the group of screens;

ii) selecting at least one master screen; and iii) moving a load bar of the master screen in compliance with an instruction received from the controller.

7. A group control method according to claim 1, wherein the movable end of each screen includes a load bar, and the load bars are moved vertically.

8. Automatic motor control for controlling a group of screens incorporating means for causing movable ends of the screens to move from respective non-aligned positions towards a common aligned position in both opening and closing directions, the motor control comprising, A. Counter means for continuously computing a position of the movable end of each screen relative to a predetermined reference position and providing the reference position to a controller;

B. The controller having means to select a common position to which the movable ends of the screens are to be moved;

C. A motor associated with each screen for moving the movable end of each screen towards the common position; and D. The controller being operable to initially energize a motor associated with at least one screen having a movable end that is furthest from the common position toward the common position without moving the movable ends of screens that are closer to the common position until the movable end of the at least one screen aligns with the movable end of at least one other screen, and thereafter simultaneously energizing a motor associated with the at least one other screen to move with the movable end at least one screen so that the movable ends of the at least one screen and the movable end of the at least one other screen move in alignment towards the common position at a common speed.

9. A home automation installation including the automatic motor control according to claim 8, wherein the screens are selected from a group of screens consisting of fabric blinds, shades and venetian blinds.

10. A home automation installation including the automatic motor control according to claim 8, wherein the screens are selected from a group of screens consisting of sunshades and louvers that are mounted to move horizontally relative to an opening.

\* \* \* \* \*